US007665036B1

(12) United States Patent
Lin et al.

(10) Patent No.: US 7,665,036 B1

(45) Date of Patent: Feb. 16, 2010

(54) SYSTEM AND METHOD FOR PRESENTING MULTIPLE SETS OF Z-SPACE INFORMATION IN A USER INTERFACE DISPLAY

(75) Inventors: Andrew Lin, San Francisco, CA (US); Jerry Knight, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 841 days.

(21) Appl. No.: 10/465,039

(22) Filed: Jun. 19, 2003

(51) Int. Cl.
*G06F 3/00* (2006.01)

(52) U.S. Cl. ....................... 715/810; 715/503; 715/815; 715/828; 715/780; 715/702

(58) Field of Classification Search ................ 715/788, 715/798, 800, 815, 810, 825, 503, 828, 780, 715/702
See application file for complete search history.

(56) References Cited

U.S. PATENT DOCUMENTS 5,546,528 A 8/1996 Johnston
6,166,736 A * 12/2000 Hugh ......................... 715/798
6,288,718 B1 * 9/2001 Laursen et al. ............. 715/800
6,781,610 B2 * 8/2004 Os et al. ..................... 715/764
7,111,240 B2 * 9/2006 Crow et al. ................. 715/723
7,278,113 B1 * 10/2007 Racine et al. ............... 715/780
2003/0164859 A1 * 9/2003 Evans ......................... 345/792
2003/0227488 A1 * 12/2003 Arend et al. ................ 345/795
2004/0119745 A1 * 6/2004 Bartek et al. ................ 345/763

* cited by examiner

*Primary Examiner*—Ryan F Pitaro

(57) ABSTRACT

A system and method are disclosed for displaying multiple sets of items on a single page comprising rendering a selection graphic for each set of the multiple sets of items, wherein the rendered selection graphics are arranged adjacent to one another, in response to choosing one of the selection graphics, moving one or more of the adjacent selection graphics away from the chosen one to create a space between the chosen one and the moved one or more of the adjacent selection graphics, and inserting the set of items associated with the chosen one of the selection graphics in the space.

12 Claims, 9 Drawing Sheets

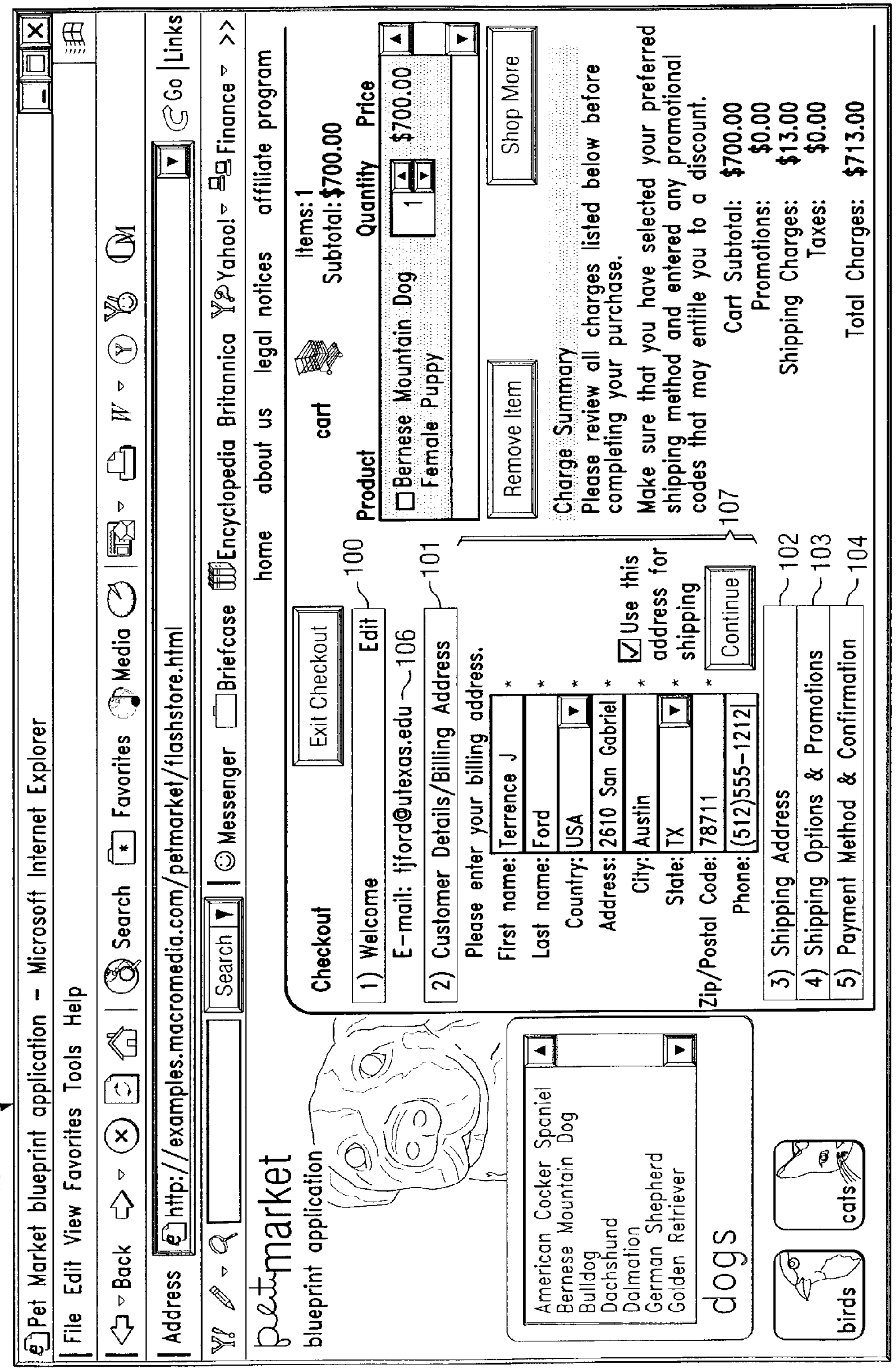
FIG. 1C
10
Pet Market blueprint application - Microsoft Internet Explorer
File Edit View Favorites Tools Help
Back
Search
Favorites
Media
Address
http://examples.macromedia.com/petmarket/flashstore.html
Go
Links
Search
Messenger
Briefcase
Encyclopedia Britannica
Yahoo!
Finance
petmarket
blueprint application
home about us legal notices affiliate program
American Cocker Spaniel
Bernese Mountain Dog
Bulldog
Dachshund
Dalmation
German Shepherd
Golden Retriever
dogs
birds
cats
Checkout
Exit Checkout
1) Welcome
Edit
100
E-mail: tjford@utexas.edu
106
2) Customer Details/Billing Address
101
Please enter your billing address.
First name: Terrence J
Last name: Ford
Country: USA
Address: 2610 San Gabriel
City: Austin
State: TX
Zip/Postal Code: 78711
Phone: (512)555-1212
Use this address for shipping
Continue
3) Shipping Address
102
4) Shipping Options & Promotions
103
5) Payment Method & Confirmation
104
cart
Items: 1
Subtotal: $700.00
Product
Quantity
Price
Bernese Mountain Dog
Female Puppy
1
$700.00
Remove Item
Shop More
Charge Summary
Please review all charges listed below before completing your purchase.
Make sure that you have selected your preferred shipping method and entered any promotional codes that may entitle you to a discount.
107
Cart Subtotal: $700.00
Promotions: $0.00
Shipping Charges: $13.00
Taxes: $0.00
Total Charges: $713.00

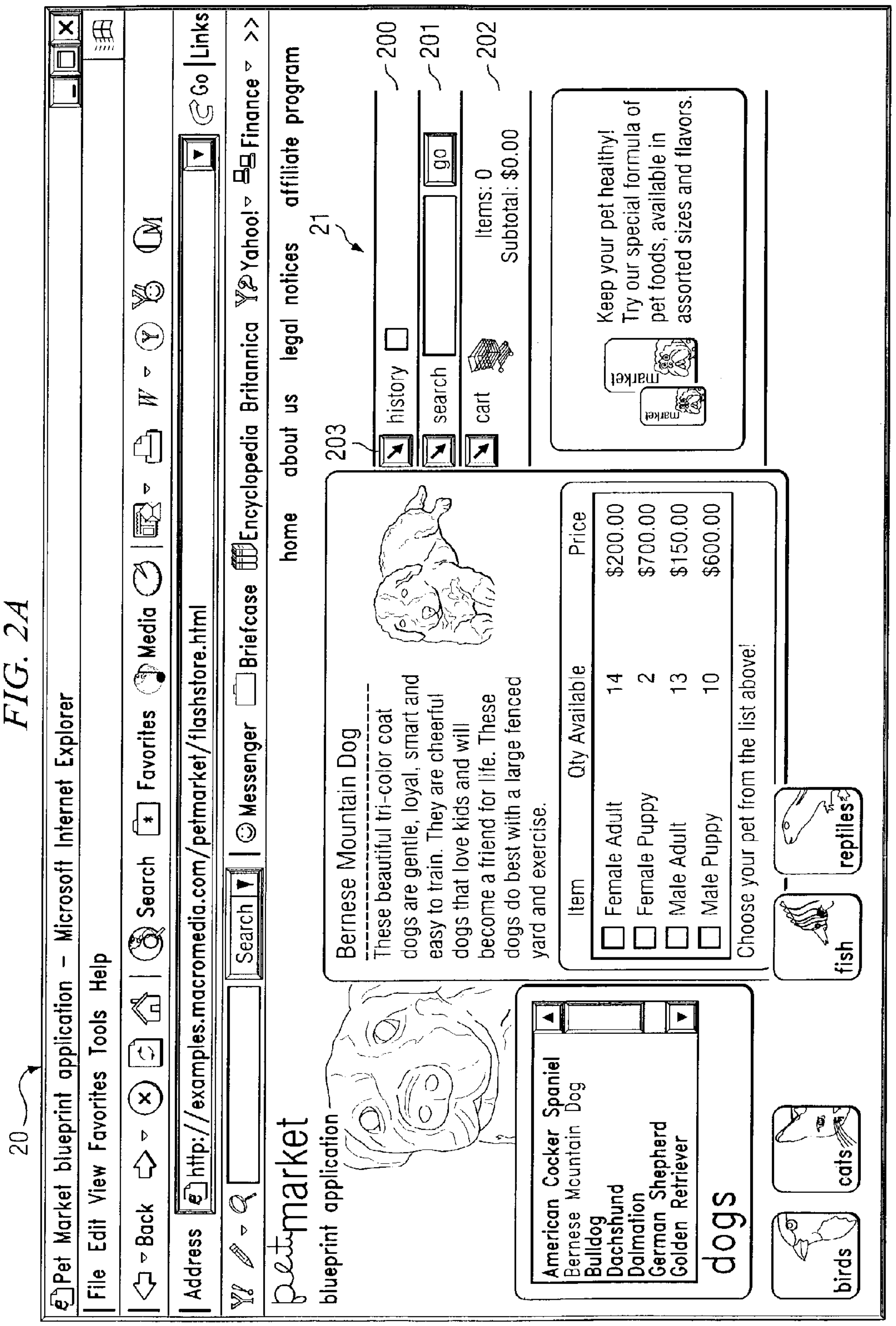

FIG. 2A
20
Pet Market blueprint application – Microsoft Internet Explorer
File Edit View Favorites Tools Help
Back
Search
Favorites
Media
Address
http://examples.macromedia.com/petmarket/flashstore.html
Go
Links
Search
Messenger
Briefcase
Encyclopedia Britannica
Yahoo!
Finance
>>
petmarket
blueprint application
home
about us
legal notices
affiliate program
21
200
201
202
203
history
search
go
cart
Items: 0
Subtotal: $0.00
Keep your pet healthy!
Try our special formula of pet foods, available in assorted sizes and flavors.
market
American Cocker Spaniel
Bernese Mountain Dog
Bulldog
Dachshund
Dalmation
German Shepherd
Golden Retriever
dogs
Bernese Mountain Dog
These beautiful tri-color coat dogs are gentle, loyal, smart and easy to train. They are cheerful dogs that love kids and will become a friend for life. These dogs do best with a large fenced yard and exercise.
Item
Qty Available
Price
Female Adult
14
$200.00
Female Puppy
2
$700.00
Male Adult
13
$150.00
Male Puppy
10
$600.00
Choose your pet from the list above!
birds
cats
fish
reptiles

SYSTEM AND METHOD FOR PRESENTING MULTIPLE SETS OF Z-SPACE INFORMATION IN A USER INTERFACE DISPLAY

TECHNICAL FIELD

The present invention relates, in general, to computer interfaces and, more specifically, to a user interface display for presenting multiple sets of z-space information.

BACKGROUND OF THE INVENTION

Computer interface technology has quickly advanced from pure text interaction to the more familiar windowed interfaces begun in personal computing by APPLE COMPUTER CORPORATION's MACINTOSH™ and later copied by MICROSOFT CORPORATION's WINDOWS™ operating system. The advancement of user interface systems is seen clearly in all aspects of computing, such as operating system interaction and Internet-related interfaces.

One advancement of user interface technology is seen in U.S. Pat. No. 5,546,528 issued to Johnston. The Johnston patent defined a method for combining additional sets of information into a group of multiple sets within a single window. The groups of information are combined from two-dimensional windows into a single window with each member of the group "stacked" on top of one another. This stacked information, sometimes referred to as z-space information, is presented to the user with visual tabs that indicate which one of the group is active and which others are available for the user's selection. While this type of interface displays indicators of each of the group members, users are not able to see any portion of the information in the group members that are not presently active. This may be a drawback for certain types of implementations that would require the user to go through a series of steps to complete the particular task.

Other well known interface display techniques have been dictated by the limitations of the computers or communication systems used. For example, in Internet applications, users are often required to fill in forms to provide information or other necessary items for interacting with some other system. In fill-in forms, the user fills in a first page which, when completed, is typically communicated to the server. The server then reads the information and sends a new form to the user for additional information. This process may cause the user's interface to refresh after every form page is sent and received. The fill-in process may comprise several pages sent back and forth between the user and the Web server. This process is disjointed and slow because it depends on the latency of the connection and the speed of the Web server. Furthermore, if the user desires to go back to a page, the system typically brings the previous page back, but without the information that the user filled in. Thus, the user would generally need to re-enter all of the information.

BRIEF SUMMARY OF THE INVENTION

Representative embodiments of the present invention are directed to a method for displaying multiple sets of items on a single page comprising rendering a selection graphic for each set of the multiple sets of items, wherein the rendered selection graphics are arranged adjacent to one another, in response to choosing one of the selection graphics, moving one or more of the adjacent selection graphics away from the chosen one to create a space between the chosen one and the moved one or more of the adjacent selection graphics, and inserting the set of items associated with the chosen one of the selection graphics in the space.

Additional representative embodiments of the present invention are directed to a graphical menu interface executable by a computer system comprising a plurality of title bars arranged adjacent to one another, information organized into multiple sets, wherein each set corresponds to one of the plurality of title bars, animation logic executable by a processor, wherein, in response to a user selecting one of the plurality of title bars, the animation logic is executed to move one or more of the plurality title bars away from the selected one of the title bars creating a space in which one of the multiple sets of information corresponding to the selected one is displayed.

Further representative embodiments of the present invention are directed to a computer program product having a computer readable medium with computer program logic recorded thereon for displaying multiple sets of z-space information to a user, the computer program product comprising code for rendering a selection graphic for each set of the multiple sets of z-space information, wherein the rendered selection graphics are arranged next to one another, in response to choosing one of the selection graphics, code for moving one or more of the adjacent selection graphics away from the chosen one to create a space between the chosen one and the moved one or more of the adjacent selection graphics, and code for inserting the set of z-space information associated with the chosen one of the selection graphics in the space.

Further representative embodiments of the present invention are directed to a method for presenting groups of information to a user on a computer comprising adjacently displaying a set of object bars on a display of the computer, wherein each one of the object bars is associated with one of the groups of information, moving one or more of the object bars a predetermined distance from another object bar responsive to the user selecting the another object bar, and displaying the one group of information associated with the another object bar in a space defined by the predetermined distance between the another object bar and the one or more moved object bars.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1C is an illustration of the screen shot exposing a subsequent step to the user;

FIG. 2A is an illustration of a screen shot having a page menu with menu bars arranged thereon;

DETAILED DESCRIPTION OF THE INVENTION

An accordion interface system, as described herein, presents a menu, fill-in form, or other similar interface operation to a user where all of the steps, menu items, stages, or the like are visible to the user, while the information that is associated with the steps, menu information, or the like are hidden in z-space. In some embodiments, as a user completes information in a fill-in form or other such information gathering operation, some of that information may remain in information bars that are visible to the user as he or she progresses through the different steps. In these embodiments, the user may see not only the required steps, but also the information that has been entered in the previous steps.

Figure 1A:
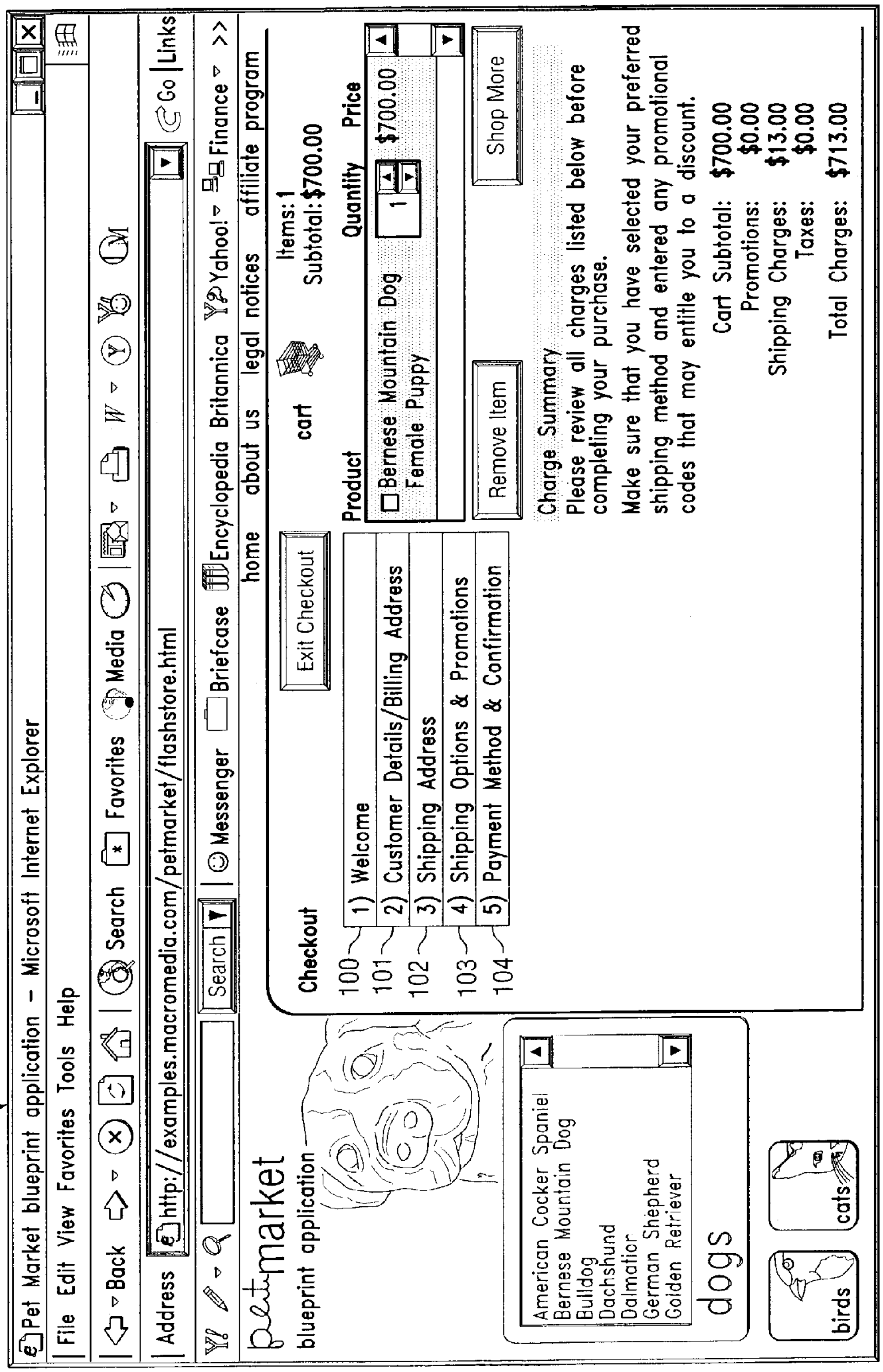
FIG. 1A is an illustration of a screen shot showing a fill-in form interface configured according to one embodiment of the present invention.

FIG. 1A is an illustration of screen shot 10 showing a fill-in form interface configured according to one embodiment of the present invention. The fill-in form includes stage bars 100-104 that present the process steps to the user. The fill-in fields may be hidden in z-space covered by stage bars 100-104.

Figure 1B:
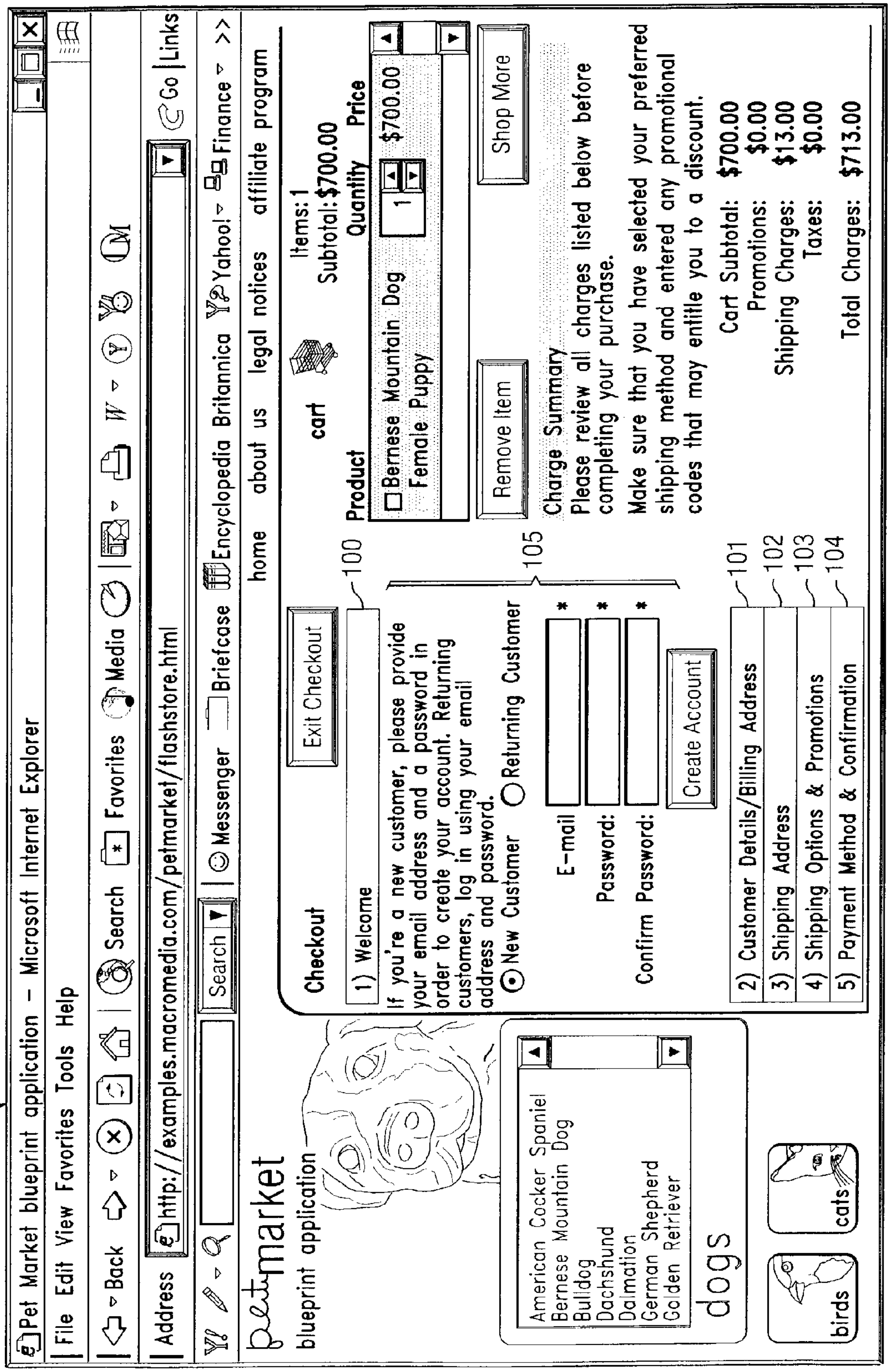
FIG. 1B is an illustration of the screen shot showing a fill-in field exposed when the user selects one of the stage bars.

FIG. 1B is an illustration of screen shot 10 showing fill-in field 105 exposed when the user selects stage bar 100. In response to the user selecting stage bar 100, an animation may execute that drops stage bars 101-104 down to make room for exposing fill-in field 105 to the user. The user may then fill in the appropriate information as necessary.

FIG. 1C is an illustration of screen shot 10 exposing a subsequent step to the user. After filling in field 105 (FIG. 1B), the user may select to proceed to the following stage by selecting stage bar 101. In response to this selection, another animation may execute that collapses fill-in field 105 into information bar 106 and exposes fill-in field 107 for the user. Stage bars 102-104 are also dropped down by the executing animation which makes the room available for fill-in field 107. The user may then complete fill-in field 107 with the necessary information.

Figure 1D:
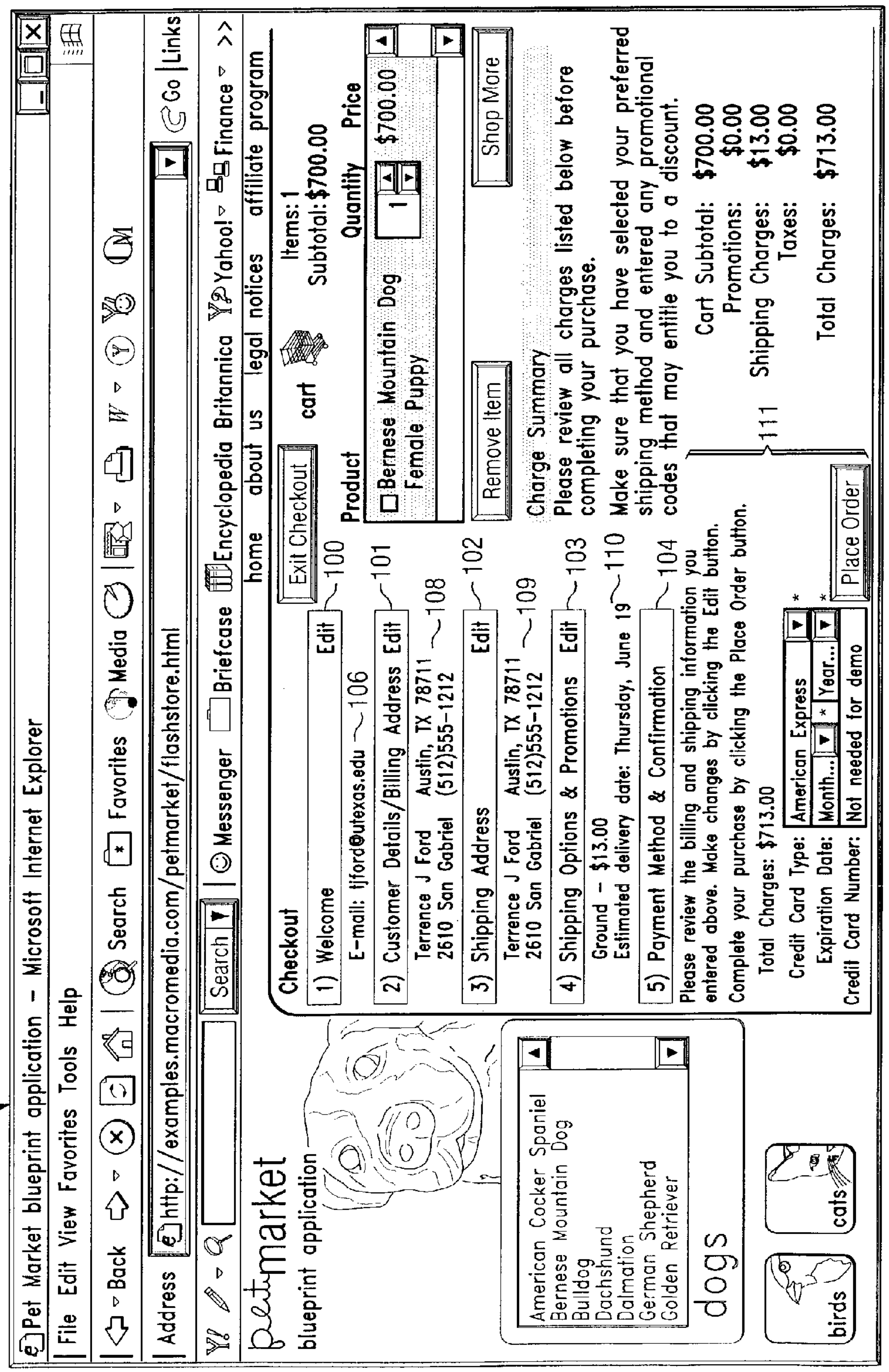
FIG. 1D is an illustration of the screen shot exposing another subsequent step to the user.

FIG. 1D is an illustration of screen shot 10 exposing another subsequent step to the user. In response to the user selecting to progress steps, another animation runs that collapses fill-in field 107 (FIG. 1C) into information bar 108. Because the embodiment illustrated shows an implementation of a check-out process, fill-in field 107 (FIG. 1C) also collapses into information bar 109 to provide both the shipping address and the billing address as the same address. Information bar 110 shows that the user selected a particular method of shipping for a certain price. The user is now presented fill-in field 111.

The accordion interface shown in FIG. 1 allows the user to view each step in a multi-stage process and, as the user progresses through the stages, it displays selected information to the user in information bars 106, 108, and 109 situated under or adjacent to the previously completed stages. By displaying the completed information to the user, the user may see incorrect information or information that he or she desires to change.

Figure 1E:
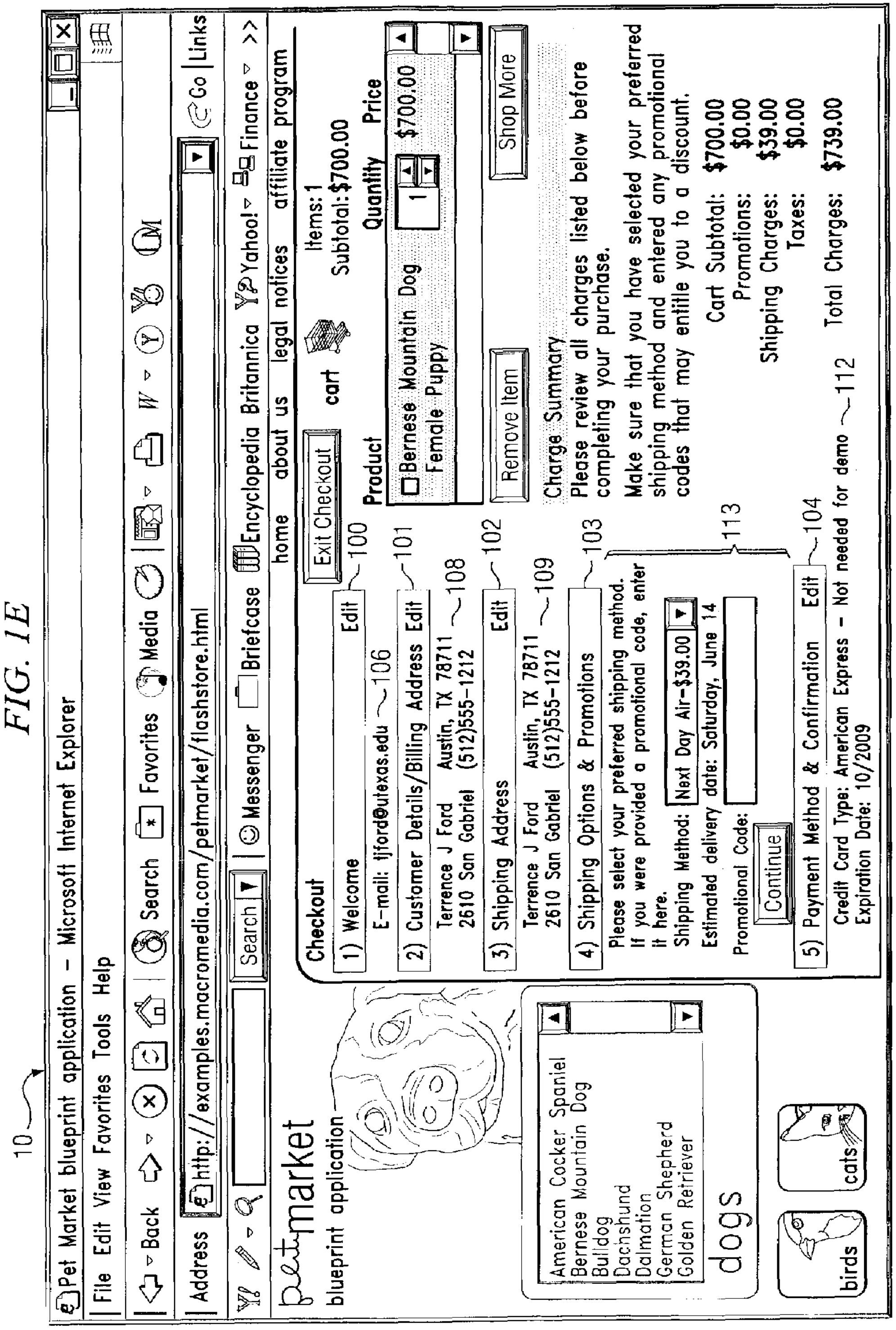
FIG. 1E is an illustration of the screen shot exposing a previously completed step.

FIG. 1E is an illustration of screen shot 10 exposing a previously completed step. In response to the user selecting stage bar 103, another animation may run that collapses fill-in field 111 into information bar 112 and may move both stage bar 104 and information bar 112 down to make room for fill-in field 113. Even though the user has already completed this field previously, he or she may now make changes as desired.

The feature shown in FIG. 1E also illustrates that some embodiments of the present invention may not require the multiple refreshes, as typically required in regular client-server communication processes. Information entered by the user may remain local to the client so that the user may have access to it as needed. Various techniques may be used in such embodiments to communicate with the remote server.

While the implementation depicted in FIG. 1 is a multi-stage form, other types of interface operations may be presented using various embodiments of the present invention. FIG. 2A is an illustration of screen shot 20 having page menu 21 with menu bars 200-202. If the user desires to see the history of his or her session at the Web site, the user selects z-space indicator 203.

Figure 2B:
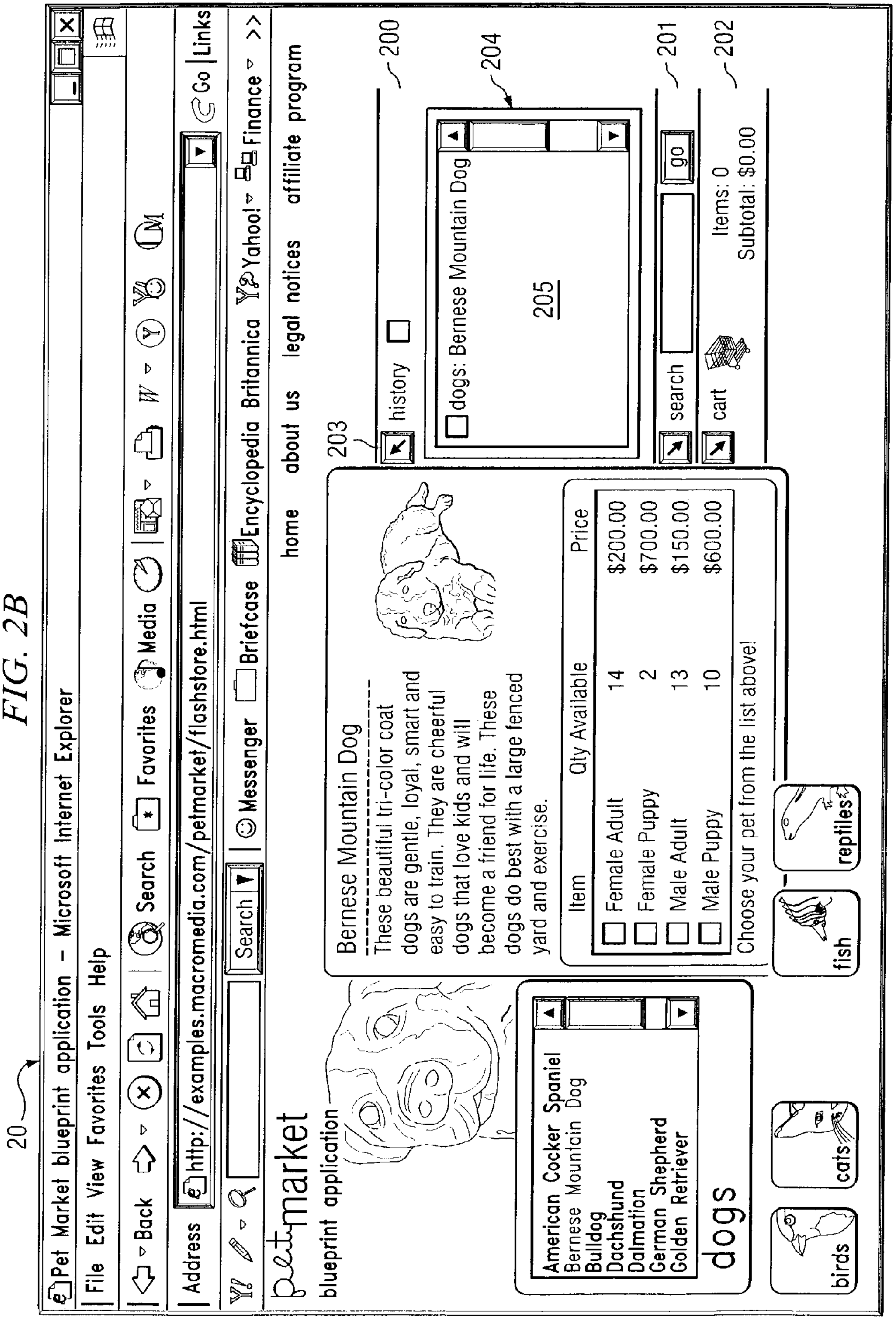
FIG. 2B is an illustration of the screen shot after selection of one of the z-space indicators.

FIG. 2B is an illustration of screen shot 20 after selection of z-space indicator 203. In response to the user selecting z-space indicator 203, an animation may execute moving menu bars 201 and 202 down opening up a space under menu bar 200 where history window 204 is exposed to the user.

Figure 2C:
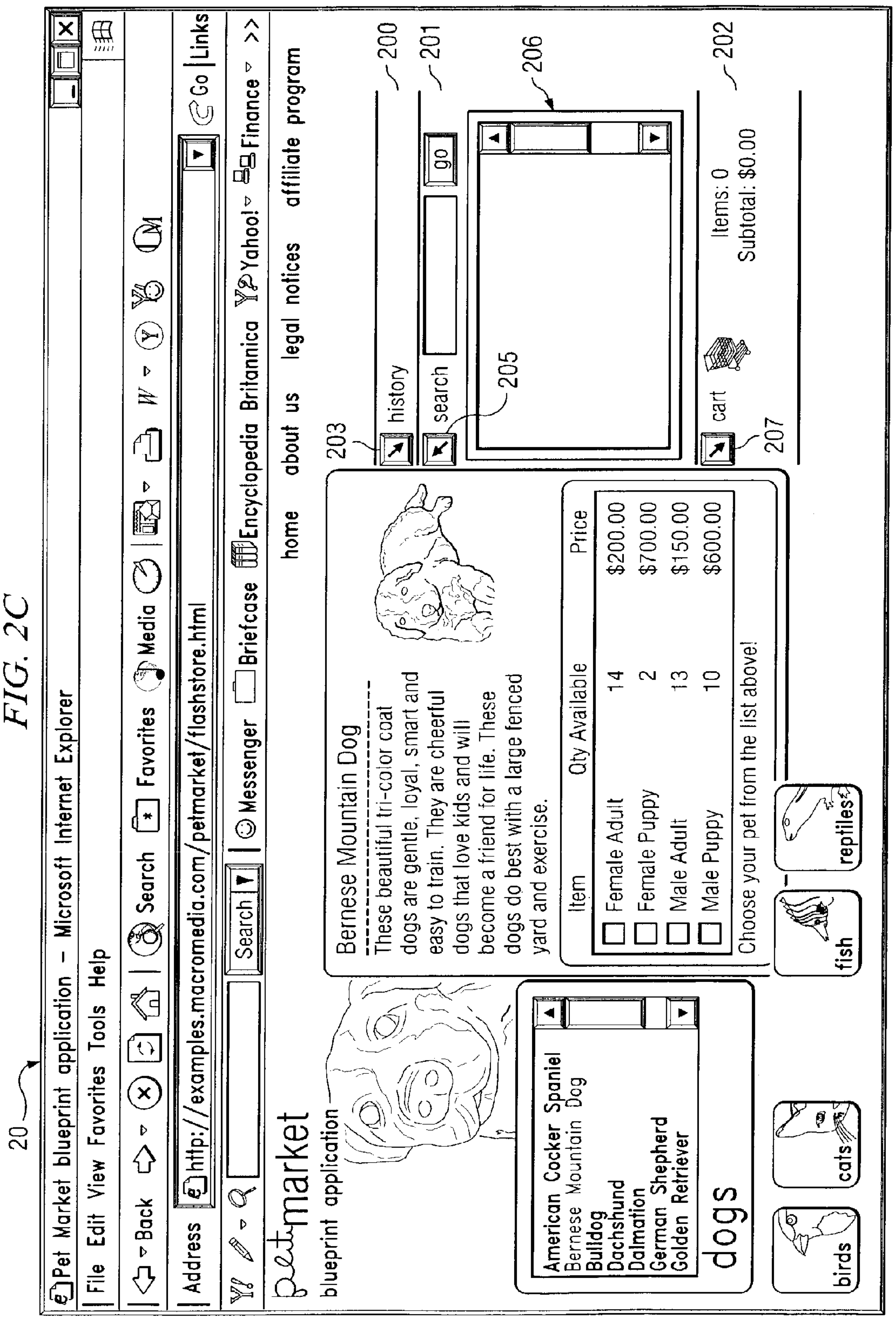
FIG. 2C is an illustration of the screen shot exposing the search window.

FIG. 2C is an illustration of screen shot 20 exposing search window 206. In response to the user selecting z-space indicator 205, an animation may be run dropping menu bar 202 down providing a space under menu bar 201 for search window 206. In some embodiments, the user is able to activate the animation for exposing and covering the z-space information by selecting z-space indicators 203 (FIG. 2B), 205, and 207. In the illustrated embodiment, menu 21 may not generally require information to be presented to the user in an information bar between menu bars 200-202. Therefore, as the animation moves menu bars 200-202 around the page, the implementation of the illustrated embodiment may not include the functionality to display information bars as shown in FIG. 1.

It should be noted that, while FIGS. 1 and 2 illustrate the accordion menu system configured having horizontal menu bars which move in the vertical plane when the menu bars are selected, other various configurations, such as vertical menu bars moving in the horizontal plane or even free shaped menu bars having various accordioned paths either preset or configured with a random path generation logic to vary the opening directions, may be implemented as desired.

When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 3:
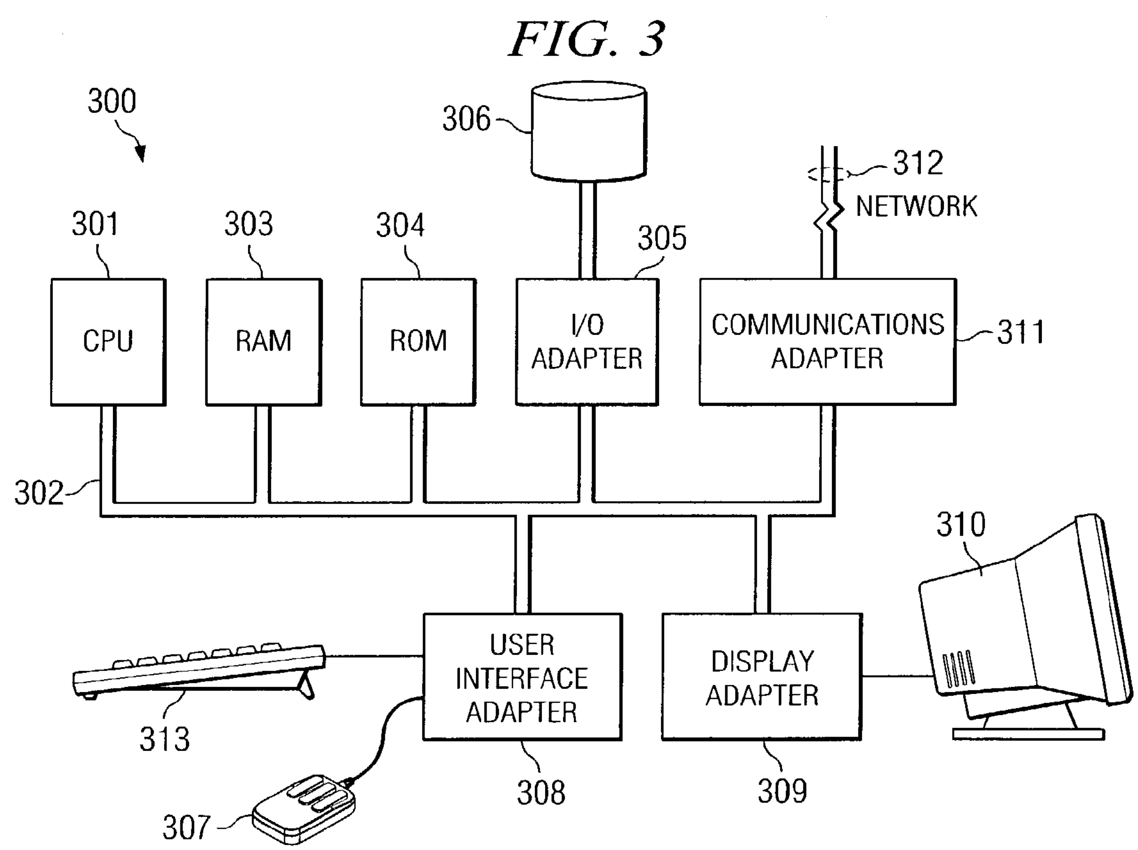
FIG. 3 illustrates a computer system adapted to use the present invention.

FIG. 3 illustrates computer system 300 adapted to use the present invention. Central processing unit (CPU) 301 is coupled to system bus 302. The CPU 301 may be any general purpose CPU, such as an INTERNATIONAL BUSINESS MACHINE (IBM) POWERPC™, INTEL™ PENTIUM™-type processor, or the like. However, the present invention is not restricted by the architecture of CPU 301 as long as CPU 301 supports the inventive operations as described herein. Bus 302 is coupled to random access memory (RAM) 303, which may be SRAM, DRAM, or SDRAM. ROM 304 is also coupled to bus 302, which may be PROM, EPROM, EEPROM, Flash ROM, or the like. RAM 303 and ROM 304 hold user and system data and programs as is well known in the art.

Bus 302 is also coupled to input/output (I/O) controller card 305, communications adapter card 311, user interface card 308, and display card 309. The I/O adapter card 305 connects to storage devices 306, such as one or more of a hard drive, a CD drive, a floppy disk drive, a tape drive, to the computer system. The I/O adapter 305 would also allow the system to print paper copies of information, such as documents, photographs, articles, etc. Such output may be produced by a printer (e.g. dot matrix, laser, and the like), a fax machine, a copy machine, or the like. Communications card 311 is adapted to couple the computer system 300 to a network 312, which may be one or more of a telephone network, a local (LAN) and/or a wide-area (WAN) network, an Ethernet network, and/or the Internet network. User interface card 308 couples user input devices, such as keyboard 313, pointing device 307, or the like, to the computer system 300. The display card 309 is driven by CPU 301 to control the display on display device 310.

Although the present invention and its advantages have been described in detail, it should be understood that various changes, substitutions and alterations can be made herein without departing from the invention as defined by the appended claims. Moreover, the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer implemented method for displaying multiple sets of items on a single page comprising:

rendering a selection graphic for each set of said multiple sets of items, wherein said rendered selection graphics are arranged adjacent to one another;

in response to choosing one of said selection graphics, moving one or more of said adjacent selection graphics away from said chosen one to create a space between said chosen one and said moved one or more of said adjacent selection graphics;

inserting a set of items associated with said chosen one of said selection graphics in said space, wherein said set of items comprise an interactive user-interface;

in response to choosing one of said selection graphics, partially closing a prior space adjacent to a prior chosen one of said selection graphics; and displaying, in the prior space, an information bar comprising information selected from said inserted set of items, wherein said information bar is placed adjacent to the selection graphic associated with the inserted set of items.

2. The method of claim 1 wherein said moving comprises:

executing an animation program for manipulating images on said single page.

3. The method of claim 1 wherein said interactive user interface comprises one or more of:

data;

multiple sub-sets of items;

application logic; and a fill-in form.

4. A graphical menu interface embodied on a computer readable medium and executing on a computer system comprising:

a plurality of title bars arranged adjacent to one another;

information organized into multiple sets, wherein each set corresponds to one of said plurality of title bars; and animation logic executable by a processor, wherein, in response to a user selecting one of said plurality of title bars, said animation logic is executed to move one or more of said plurality of title bars away from said selected one of said title bars creating a space in which one of said multiple sets of information corresponding to said selected one is displayed, partially closing a prior space adjacent to a prior chosen one of the title bars and displaying, in the prior space, an information bar comprising information selected from an inserted set of items, the information bar being placed adjacent to the title bar associated with the inserted set of items, wherein said set of information comprises an interactive user interface.

5. The graphical menu interface of claim 4 wherein said interactive user interface comprises one or more of:

data;

a plurality of sub-sets of information;

computer logic; and a fill-in form.

6. A computer program product having a computer readable medium with computer program logic recorded thereon for displaying multiple sets of z-space information to a user, said computer program product comprising:

code for rendering a selection graphic for each set of said multiple sets of z-space information, wherein said rendered selection graphics are arranged next to one another;

in response to choosing one of said selection graphics, code for moving one or more of said adjacent selection graphics away from said chosen one to create a space between said chosen one and said moved one or more of said adjacent selection graphics;

code for inserting and displaying a set of z-space information associated with said chosen one of said selection graphics in said space, wherein said set of z-space information comprises an interactive user interface;

in response to executing said code for choosing one of said selection graphics, code for partially closing a prior space next to a prior chosen one of said selection graphics;

code for displaying, in the prior space, an information bar comprising information selected from said inserted set of z-space information, wherein said information bar is placed next to the selection graphic associated with the inserted set of z-space information.

7. The computer program product of claim 6 wherein said code for moving comprises:

code for manipulating images on said single page.

8. The computer program product of claim 6 wherein said interactive user interface comprises one or more of:

data;

multiple sub-sets of items;

application logic; and a fill-in form.

9. A computer implemented method for presenting stages of a functional process to a user on a computer comprising:

adjacently displaying a set of stage bars on a display of said computer, wherein each one of said stage bars represents a stage in a functional process and each one of said stage bars is associated with at least one interactive user interface;

moving one or more of said stage bars a predetermined distance from another stage bar responsive to said user selecting said another stage bar;

displaying said at least one interactive user interface associated with the other stage bar in a space defined by said predetermined distance between the other stage bar and said one or more moved stage bars;

removing a previously displayed interactive user interface associated with a prior stage bar;

partially deleting a previous space defined by said predetermined distance between said prior stage bar and one or more previously moved stage bars; and displaying, in the partially deleted previous space, a data bar containing information selected from said previously displayed interactive user interface.

10. The method of claim 9 wherein said interactive user interface comprises one or more of:

data;

sub-sets of information;

computer logic; and a fill-in form.

11. A computer implemented method of displaying multiple sets of interactive user interface items on a single page, said method comprising:

rendering selection graphics for each interactive user interface item, wherein the selection graphics provide limited user interaction for selecting a desired interactive interface corresponding to the selection graphic;

in response to receiving said limited input, selecting a interactive user interface item;

exposing one or more interactive user interface elements corresponding to the selected interactive user interface item to permit additional user interaction;

removing previously exposed interactive user interface elements associated with a prior selection graphic;

partially deleting a previous space adjacent to the prior selection graphic; and inserting and displaying, in the partially deleted previous space, a data bar containing information selected from said removed interactive user interface elements.

12. The method of claim 11 wherein said elements are selected from the list consisting of:

data;

multiple sub-sets of items, application logic and a fill-in form.

* * * * *

UNITED STATES PATENT AND TRADEMARK OFFICE

CERTIFICATE OF CORRECTION

PATENT NO. : 7,665,036 B1
APPLICATION NO. : 10/465039
DATED : February 16, 2010
INVENTOR(S) : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1112 days.

Signed and Sealed this

Seventh Day of December, 2010

David J. Kappos
*Director of the United States Patent and Trademark Office*